Patented July 5, 1949

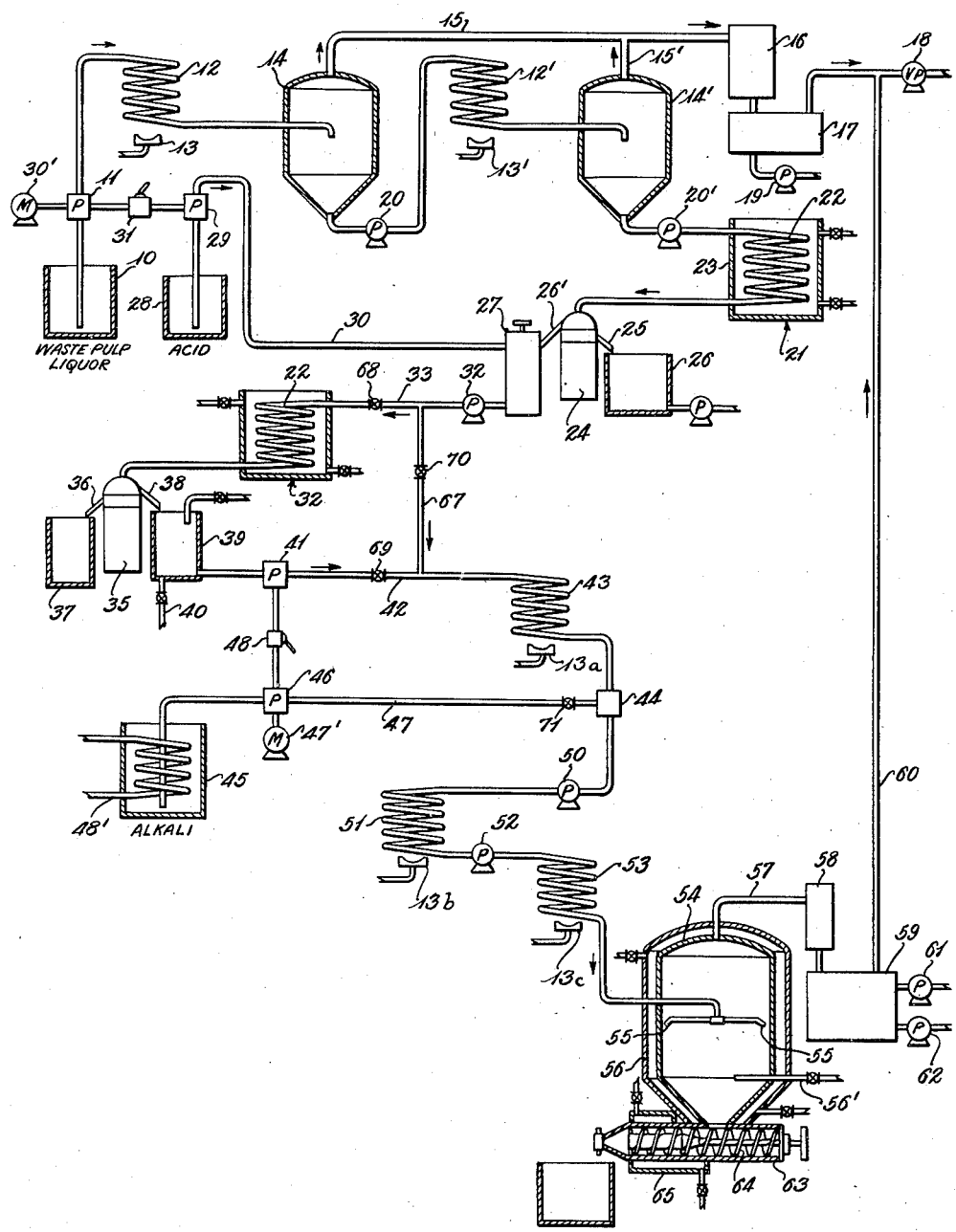

2,475,361

UNITED STATES PATENT OFFICE 2,475,361

PROCESS OF TREATING WASTE PULP LIQUORS

Benjamin H. Thurman, New York, N. Y., assignor to Benjamin Clayton, doing business under the fictitious name and style of Refining, Unincorporated Application March 6, 1946, Serial No. 652,456

11 Claims. (Cl. 260—97.5)

This invention relates to a process of treating waste pulp liquors and more particularly to a process of directly producing a high quality tall oil or a high quality soap directly from said liquors or from tall oil while providing for the recovery of other chemicals in said liquors for re-use in producing pulp and also the recovery of valuable sterols and higher fatty alcohols.

Waste pulp liquors are produced in large amounts in the paper making industries by digesting wood chips with various alkalies including caustic soda and other chemicals under pressure. In alkali processes, approximately one-half the wood is dissolved to produce a liquor which contains not only excess chemicals but fats and resins in the form of sodium soaps. Large amounts of such soaps are present particularly in liquors resulting from the alkali treatment of pine or similar woods, which are largely supplanting other woods. The chemicals must be separated from the soap and recovered for re-use in the manufacture of paper. This has heretofore been accomplished by evaporating batches of the waste liquor in large containers to a solids content of between approximately 44 to 55% and then burning this residue to produce an ash from which alkali can be leached for re-use in the process. The soap has usually formed a part of the material burned because of the difficulty and expense of separating the soap from waste pulp liquor. The saponifiable acids combined with alkali to form the soap have thus been destroyed even though they are valuable materials.

When the soap has been separately recovered, this has been accomplished by stopping the evaporation when the waste pulp liquor reaches a solids content between approximately 20 to 30% and transferring the thus concentrated liquor to a skimming tank. At these concentrations, the soap grains out of solution and rises to the top so that it can be skimmed from the concentrated liquor. After the soap has been skimmed from the concentrated liquor, evaporation is continued and the residue burned. Such a soap recovery process requires extremely expensive large-scale equipment for storage and skimming of the concentrated liquor. Also, the soap still contains large amounts of water and impurities and has been discarded as worthless; or has been either subjected to expensive and time consuming purification treatments or converted into a material known as liquid rosin or tall oil by acidifying the soaps with mineral acids and subjecting the acidic material to extensive purification treatments.

Centrifugal separation of the soap from the concentrated liquor has also been suggested but this has been found to be an extremely difficult operation. In the batch evaporation processes of the prior art, including multiple effect evaporation, a centrifugally separable mixture has not been consistently produced. When the waste pulp liquor has been evaporated to a minimum solids concentration at which all or substantially all of the soap has been thrown out of solution, a condition necessary for centrifugal separation, the soap phase usually has a specific gravity approximately the same as the salt solution making up the remainder of the concentrated liquor, making efficient centrifugal separation impossible. If evaporation is carried further so as to increase the specific gravity of the salt solution, the soap deposits in the evaporators or agglomerates into large masses so that a centrifugally separable mixture is not produced.

In accordance with the present invention, the soaps are continuously centrifugally separated from the waste pulp liquor. This is accomplished by concentrating the waste pulp liquor in a continuous flash evaporation step in which the concentrated liquor is kept in rapid movement in stream flow. Under these conditions, the soap is maintained in small particles in substantially uniform suspension in the cencentrated liquor even though the concentration is carried sufficiently far to cause the salt solution of the concentrated solution to be substantially heavier than the soap phase. A resulting mixture of soap and salt solution which is easily separated in a continuous centrifugal separator is thus produced. A much cleaner separation is accomplished and the separated soap can be subjected directly to purification treatment for producing soap and valuable sterols and higher fatty alcohols or are first converted continuously into tall oil which may then be converted into a high quality soap with recovery of sterols and higher fatty alcohols. The invention also contemplates the steps of continuously converting tall oil from whatever source derived into such a high quality soap with recovery of valuable by-products.

It is, therefore, an object of the invention to provide a process for continuously concentrating waste pulp liquor and separating sodium soaps therefrom.

Another object of the invention is to provide a process of producing high quality soaps directly from waste pulp liquors with the recovery of valuable by-products.

A further object of the invention is to provide a process of purifying waste pulp liquors and recovering valuable soap and other products therefrom by converting soaps separated from the liquor into tall oil and then saponifying the tall oil under high temperature conditions.

A still further object of the invention is to provide a process of treating tall oil by which the same is continuously converted into high quality soap products and by which valuable sterols and higher fatty alcohols are recovered as by-products.

Other objects and advantages of the invention will appear in the following description of preferred embodiments of the invention given in connection with the attached drawing which is a schematic diagram of an apparatus suitable for carrying out the present invention.

Referring more particularly to the drawing, 10 indicates a source of supply of waste pulp liquor. A stream of this liquor is withdrawn by a pump 11, which may be a proportioning pump, and forced through a heating device shown as a heating coil 12, heated by a burner 13 for gaseous or liquid fuel. The heated stream of pulp liquor is then delivered into a vapor separating chamber 14 wherein water is vaporized from the liquor. A two-stage continuous evaporation system is disclosed employing a second heating coil 12', a second burner 13' and a second vapor separating chamber 14', as it is difficult to evaporate sufficient water in a single stage without requiring the imparting of extremely high temperatures to the materials in the heating coil 12. By using two stages, moderate temperatures may be employed in both coils 12 and 12' to produce a relatively concentrated solution of the salts and other chemicals in the pulp liquor so as to cause the soap also contained in the liquor to be thrown out of the solution or "grained out." Vapors are withdrawn from the vapor separating chamber 14 by means of a pipe 15 and from the vapor separating chamber 14' by a pipe 15' and delivered to a condenser 16 wherein the vapors are condensed and delivered to a receiver 17. A vacuum pump 18 may be connected to the receiver 17 for maintaining a vacuum in the receiver, condenser 16 and vapor separating chambers 14 and 14'. A relatively high vacuum such as that corresponding to from 27 to 29 inches of mercury is preferably maintained in the vapor separating chambers, although with less efficiency, a lower vacuum or even atmospheric pressure may be employed. Condensed liquor, which is predominantly water, may be withdrawn from the receiver 17 by means of the pump 19. Sufficient heat should be supplied to the liquor in the coils 12 and 12' to remove the desired amount of water from the liquor. In order to impart sufficient heat to the liquor, the temperature reached in the coils 12 and 12' will ordinarily be somewhat greater than the boiling point of the liquor at the pressure in the coil so that at least a part of the water will be converted to vapors in the coils. The pressure in the coils need not be substantially greater than that necessary to force the liquor through the coil and deliver the same into the vapor separating chambers 14 and 14' although somewhat higher pressures may be employed by restricting the inlet of the material in the vapor separating chambers. Thus, temperatures of approximately 150 to 250° F. may be employed depending upon the pressure in the coil and the amount of water necessary to be removed in order to produce the concentrated solution of salts above referred to. With a single coil and vapor separating chamber, temperatures between approximately 500 and 600° F. are usually required to produce a sufficiently concentrated liquor. The concentration of the liquor necessary to be reached in the vapor separating chamber 14 will depend upon the relative amounts of soap and other chemicals present in the liquor and is preferably sufficient to not only render substantially all of the soap insoluble in the resulting solution of salts at the temperature employed for separating the soap from the concentrated liquor but to increase the specific gravity of the solution so that efficient continuous centrifugal separation is accomplished.

Evaporation of water from the liquor will usually substantially reduce the temperature thereof in the vapor separating chamber 14. This liquor is withdrawn from the vapor separating chamber by means of a pump 20 passed through the heating coil 12' and delivered to the second vapor separating chamber 14'. The temperature again drops in the vapor separating chamber 14'. The concentrated liquor is withdrawn from the chamber 14' by a pump 20' and passed through a heat exchange device 21 shown as a coil 22 positioned in a casing 23, through which any desired heating or cooling medium may be circulated. The liquor is then delivered to a continuous centrifugal separator 24 for continuously separating the soap from the salt solution. The heat exchange device 21 is employed to adjust the temperature of the mixture of soap and salt solution to that found most efficient for the particular mixture being separated. This temperature will depend upon the nature of the soaps as well as the concentration of the salt solution and no precise temperature applicable to all mixtures of soap and salt solutions can be given. Ordinarily this temperature will range between 125 and 200° F. The salt solution is discharged from the centrifugal separator as the heavy effluent through the spout 25 into a receiver 26 from which it may be returned to the paper making process.

The rapid stream flow evaporation system above described prevents excessive agglomeration of the soap in the concentrated solution or deposition of the soap so that a substantially uniform suspension of small particles of soap in a heavier salt solution is delivered to the centrifugal separator. The system can be operated so that the concentration of the liquor in the first evaporation stage does not become sufficiently great to cause graining out of soap in which case this stage can be replaced by a conventional batch or effect evaporator although there is no particular advantage in so doing. It is preferred to operate both stages as continuous flash evaporation steps so that the evaporation load may be distributed between the two stages without having to maintain the liquor from the first stage below any particular concentration. The important consideration is that any evaporation stage, even if a single stage be used, in which a concentration is reached causing graining out of soap, should be of a type which keeps the concentrated liquor in constant movement to prevent the formation of large soap agglomerates. In the continuous flash evaporation step of the present invention, small particles of soap are precipitated in the mixture discharged into a vapor separating chamber during evaporation of water from the mixture. A resulting mixture of the soap particles and salt solution is deposited in the lower portion of the evaporation chamber and promptly withdrawn therefrom in the form of a stream which is kept in constant motion until it reaches a centrifugal separator. A uniformly separable mixture is thereby delivered to the separator.

The concentration of the liquor which must be reached in the evaporation step will depend upon the particular waste pulp liquor being treated. It may be as low as 20% solids, which is the approximate concentration at which the soap becomes insoluble in the salt solution, if the soap phase of the particular material is sufficiently light with respect to the salt solution to produce adequate centrifugal separation. Ordinarily, however, the concentration must be carried somewhat further than 20% solids in order to increase the specific gravity of the salt solution, but will rarely have to exceed 28 to 30% solids.

The soap separated from the salt solution is discharged as the lighter effluent through a spout 26 and delivered into a mixing device 27 which may be of any suitable type but is preferably a mechanical agitator. In the preferred process of the present invention, soap is admixed in the mixer 27 with sufficient mineral acid to decompose the soap into acids and soluble sodium salts. In order to accomplish this, sufficient acid solution is withdrawn from a source of supply 28 by means of a proportioning pump 29 and delivered by the pipe 30 into the mixer 27. In order to maintain a constant proportion of acid solution and soap, the proportioning pumps 11 and 29 for the waste pulp liquor and acid solution may be driven by a variable speed electric motor 30' with a variable speed device 31 positioned between the pumps so that any desired amounts and proportions of waste pulp liquor and acid solution can be delivered by the pumps. Any other suitable type of proportioning means can be employed for that shown. The acid employed is preferably sulfuric acid although other strong acids known to the art for the same general purpose can be employed. The acid is diluted sufficiently with water to form a flowable mixture in the mixing device 27. The mixture produced in the mixer 27 contains substantially the same materials found in the tall oil of commerce, admixed with a solution of any excess acid and sodium salts, such as sodium sulfate, if sulfuric acid is employed in the process. This mixture is withdrawn from the mixer 27 by means of a pump 32 and delivered through a pipe 33 to a heat exchange device 34 which may be similar to the heat exchange device 24, and is then delivered to a continuous centrifugal separator 35 in which the tall oil is continuously centrifugally separated from the salt solution. The heat exchange device 34 is employed to adjust the temperature of the mixture to that giving most efficient separation. This temperature will vary with different operations depending upon the nature of the original waste pulp liquor processed and the relative proportions of tall oil and salt solution in the mixture being separated, but will ordinarily fall between 100 and 200° F. The salt solution is discharged as the heavy effluent from the centrifugal separator 35 through a spout 36 into a receiver 37. The tall oil is discharged as the lighter effluent through the spout 38 into a receiver 39. This material is a high grade tall oil and all or part of it may be withdrawn from the process through a pipe 40 and sold as an article of commerce.

It is preferred, however, to immediately convert the tall oil into high quality soap products with the recovery of valuable by-products. This can be done by withdrawing the tall oil from the tank 39 by means of a proportioning pump 41 and delivering the same through a pipe 42 to a heating device shown as a coil 43 heated by means of a burner 13a. The tall oil is preheated in the coil 43 to a relatively high temperature, for example, between 250 and 350° F., under pressure, and is then delivered to a flow mixing device 44. A saponifying agent, preferably a solution of caustic soda, is withdrawn from a source of supply 45 by means of a proportioning pump 46 and delivered through the pipe 47 to the mixer 44 for saponifying the tall oil. The proportioning pumps 41 and 46 are shown as being driven by a variable speed motor 47' with a variable speed device 48 positioned between the pumps although any suitable proportioning mechanism capable of delivering accurate proportions of tall oil and alkali solution can be employed. The alkali solution is preferably preheated in the tank 45 by means of a coil 48' through which any desired heating medium may be circulated. Thus, the alkali solution is ordinarily delivered to the mixer 44 at temperatures approaching the boiling point of the alkali solution in order to maintain a relatively high temperature therein. The flow mixer 44 may be of any suitable type, such as that disclosed in my Patent No. 2,216,680, issued October 1, 1940, or may be a closed mechanical agitator. Because of the high temperature in the mixing device 44, rapid saponification of tall oil takes place and a mixture of fatty acid and rosin acid soaps, sterols, higher alcohols, and water is formed therein. This mixture is passed by a pump 50 through a heating coil 51 heated by a burner 13b to maintain or somewhat increase the temperature of the mixture to substantially completely saponify any saponifiable material not converted into soap in the mixer 44. The temperature reached in the heating coil 51 will ordinarily be between 300 and 450° F. The substantially completely saponified mixture is then forced by a booster pump 52 through a heating coil 53 heated by a burner 13c in order to raise the temperature of the mixture sufficiently to separate water, sterols and higher fatty alcohols from the soap in vapor form. The temperature reached in the coil 53 will vary between 450 and 600° F. depending upon the nature of the volatiles present in the mixture and the amount thereof.

This heated mixture is then delivered into a vapor separating chamber 54 in which vapors of water, sterols and fatty alcohols are separated from the soap in order to produce a substantially pure anhydrous soap. The heating coils 43 and 51 are usually operated under sufficient pressure to prevent vapor formation but pressure in the coil 53 is ordinarily maintained sufficiently low that substantial vapor formation takes place therein in order that sufficient heat may be imparted to the mixture to cause substantially complete separation of the volatile materials in the vapor separating chamber 54. The mixture delivered to the vapor separating chamber is preferably discharged against the walls of this chamber by nozzles 55 so that the soap, which is of sufficiently high temperature to be in liquid form even when anhydrous, flows down the walls of the vapor separating chamber 54. This provides for efficient liberation of vapors from the liquid soap and also provides an unimpeded path for vapors inwardly and upwardly through the vapor separating chamber. The vapor separating chamber 54 is preferably provided with a heating jacket 56 through which any desired heating medium may be circulated so as to maintain the walls thereof in a heated condition to retain the soap in liquid form and superheated steam may, if desired, be introduced into the chamber 54, through a pipe 56'. Vapors are withdrawn from the vapor separating chamber 54 through a pipe 57 and delivered to a condenser 58 in which the vapors are condensed. The condensed vapors are delivered to a receiver 59 which is connected to the vacuum pump 18 through a pipe 60 in order to maintain the receiver 59, condenser 58 and vapor separating chamber 54 under vacuum conditions. A relatively high vacuum, for example, a vacuum ranging from 27 to 29 inches of mercury is preferably maintained in the vapor separating chamber 54 in order to secure substantially complete vapor separation. The condensate collected in receiver 59 is a mixture of water, sterols and higher fatty alcohols. The sterols and higher fatty alcohols are substantially insoluble in the water and will separate from the water as an upper layer. This upper layer may be withdrawn from the receiver 59 by a pump 61 and water may be likewise withdrawn from the receiver 59 by a pump 62.

The soap from which the vapors have been withdrawn is in liquid substantially anhydrous condition, substantially free of sterols and fatty alcohols and flows down the walls of the vapor separating chamber 54 into the housing 63 of a screw conveyor 64. The housing 63 is provided with a cooling jacket 65 through which any desired cooling medium may be circulated in order to cool and solidify the soap so that it may be discharged to the atmosphere without injury thereto and also form a vacuum seal for the vapor separating chamber 54. The vapor separating chamber 54, and associated conveyor mechanism, may be the same as that disclosed in detail in the patent of Benjamin Clayton and Benjamin H. Thurman, No. 2,190,615, issued February 13, 1940.

The soap separated from the salt solution by the centrifugal separator 24 is substantially free from salt solution and may be directly converted into a high quality soap, even if the acidulation and resaponification steps of the process above described are eliminated. This soap, however, contains in admixture, the sterols and higher fatty alcohols above referred to. Since the heavy effluent of soap discharged from the centrifugal 24 may comprise a relatively thick viscous material, water may be delivered to the mixer 27 from a tank 28 instead of an acid solution by means of the proportioning pump 29. A flowable mixture of soap and water is thereby produced in the mixer 27 and may be delivered by the pump 32 directly to the heating coil 43 through pipes 67 and 42 by closing the valves 68 and 69 in the pipes 33 and 42 and opening the valve 70 in the pipe 67. The valve 71 in the alkali delivery pipe 47 may likewise be closed and the centrifugal 35 and proportioning pumps 41 and 46 stopped so that the soap mixture from coil 43 is delivered directly to the coil 51 by means of the pump 50. A by-pass (not shown) may be employed to carry the soap mixture around the mixer 44, if desired, although this is not necessary. The subsequent treatment of the soap mixture is the same as for that produced in the mixer 44 when the soap from the centrifugal separator 24 is first acidulated and the resulting tall oil saponified in the mixer 44. In this connection, tall oil, from other sources, may be employed as the saponifiable material which is admixed with the alkali in the mixer 44.

In any case, the resulting soap produced is a mixture of sodium soaps of fatty acids and rosin acids. This soap is of high quality and has excellent detergent properties. It can easily be rehydrated to produce soap powders or bar soap or can be employed to produce insoluble soaps by mixing a solution of the same with alkaline earth metal compounds. The soap produced, by acidulating the soap originally separated from the salt solution by the centrifugal separator 24 and then re-saponifying the acids separated from the acidulated material, is, however, of better quality, as substantial amounts of impurities are removed in the acidulating steps, including the centrifugal separation in the centrifugal separator 35.

As a modification of the process, the purified soap removed from vapor separating chamber 54 may be acidified to liberate the fatty and resin acids. Following this, the mixture may be distilled at high temperature, preferably in a vacuum, to separate the mixture into a resin acid fraction and a fatty acid fraction. These acids may then be converted into soap or may be used for any other purpose. As another modification, tall oil such as the acidified material in tank 39 may be subjected to fractional distillation to separate the fatty acids from the resin acids, following which the resin acids may be saponified according to the previously described process and the saponified mixture discharged into vapor separating chamber 54 to separate the unsaponifiable material from the saponified resin acids. In this way it is possible to produce a purified soap consisting essentially of resin acid soaps.

The present invention is applicable to the treatment of waste pulp liquors from any source whether from an acid digestion process or from an alkaline digestion process. It will be apparent that the material discharged from the light effluent spout 26' of centrifuge 24 will be composed primarily of soaps when the pulp liquor being treated is alkaline. When the pulp liquor being treated is acid, the light effluent discharged at this point will contain free resin acids and free fatty acids together with calcium and magnesium soaps which are insoluble in the particular acid concentration encountered. This difference in the pH of the pulp liquor being treated does not materially alter the process. In the event that an acid liquor is being treated, the amount of acid withdrawn from tank 28 may be materially reduced or may be eliminated entirely. Any acid which is used, however, would decompose the calcium and magnesium soaps and at the same time ensure a cleaner separation of the acids from the liquor. In any event, the treatment in coil 12 and in chamber 14 is primarily for the purpose of concentrating the liquor so as to render the oily resinous material insoluble and thus separable from the waste liquor. The remainder of the process following the addition of acid may be conducted in identical manner regardless of the source of the oily resinous material.

This application is a continuation-in-part of my copending application, Serial No. 402,872, filed July 17, 1941, now abandoned, which is in turn a continuation-in-part of my application, Serial No. 238,009, filed October 31, 1938, now abandoned.

It will thus be seen that I have provided a simple and continuous process of producing high quality soap directly from waste pulp liquors and that this process provides for re-use of chemicals in the pulp liquor in the paper process and also for the recovery of valuable products other than While I have disclosed the preferred embodiments of my invention, it is understood that the details thereof may be varied within the scope of the following claims:

I claim:

1. In the process of producing a purified soap product, the steps which comprise mixing a flowing stream of saponifiable fatty and resin acids derived from waste pulp liquor with a flowing stream of an aqueous saponifying reagent, heating the resulting soap mixture to a temperature above the melting point of said soap when anhydrous, delivering the heated stream into a vapor separating zone and removing substantially all of the water and other vaporizable materials contained therein so as to produce a molten mass of substantially anhydrous soap, removing said soap from said vapor separating zone, acidifying said soap to liberate a mixture of fatty and resin acids, and fractionating said mixture to separate said resin acids from said fatty acids.

2. The process of separating material containing saponifiable acids combined with alkali from waste pulp liquor and recovering a purified soap therefrom, which comprises, withdrawing a stream of said liquor from a source of supply, heating said stream during flow thereof to a temperature sufficient to cause a predetermined amount of water to be in vapor form after discharge of said stream into a vapor separating chamber, discharging said stream into said vapor separating chamber, withdrawing sufficient water in the form of vapor from said chamber to cause said material in said liquor to become insoluble therein and produce a centrifugally separable mixture of said material and concentrated liquor, continuously withdrawing a stream of said centrifugally separable mixture from said chamber, delivering said stream to a continuous centrifugal separator, withdrawing a stream of said material from said centrifugal separator, mixing said stream of said material with a proportioned stream of mineral acid to produce a resultant mixture containing free saponifiable acids, delivering a stream of said resultant mixture to a centrifugal separator, continuously centrifugally separating said free saponifiable acids from said resultant mixture in said separator, mixing a proportioned stream of said free saponifiable acids with a proportioned stream of a saponifying agent to produce a mixture containing soap, delivering a heated stream of the last-mentioned mixture to a vapor separating zone, and continuously removing vapors therefrom to produce a purified soap from said free saponifiable acids.

3. The process of separating material containing saponifiable acids combined with alkali from waste pulp liquor and recovering a purified soap therefrom, which comprises, withdrawing a stream of said liquor from a source of supply, heating said stream during flow thereof to a temperature sufficient to cause a predetermined amount of water to be in vapor form after discharge of said stream into a vapor separating chamber, discharging said stream into said vapor separating chamber, withdrawing sufficient water in the form of vapor from said chamber to cause said material in said liquor to become insoluble therein and produce a centrifugally separable mixture of said material and concentrated liquor, continuously withdrawing a stream of said centrifugally separable mixture from said chamber, delivering said stream to a continuous centrifugal separator, withdrawing a stream of said material from said centrifugal separator, mixing said stream of said material with a proportioned stream of mineral acid to produce a resultant mixture containing free saponifiable acids, delivering a stream of said resultant mixture to a centrifugal separator, continuously centrifugally separating said free saponifiable acids from said resultant mixture in said separator, mixing a proportioned stream of said free saponifiable acids with a proportioned stream of a saponifying agent to produce a mixture containing soap, heating a stream of the last-mentioned mixture to a temperature above the melting point of said soap when anhydrous, delivering said last-mentioned stream in heated condition into a vapor separating zone, removing vapors from said zone at a rate sufficient to maintain a vacuum therein and to remove substantially all of the water contained in said last-mentioned mixture so as to produce a molten mass of substantially anhydrous soap from said free saponifiable acids.

4. The process of recovering purified soap from waste pulp liquor containing said soap, which comprises, withdrawing a stream of said liquor from a source of supply, heating said stream during flow thereof to a temperature sufficient to cause a predetermined amount of water to be in vapor form after discharge of said stream into a vapor separating chamber, discharging said stream into said vapor separating chamber, withdrawing sufficient water in the form of vapor from said chamber to render insoluble soap contained in said liquor and produce a centrifugally separable mixture of said soap and concentrated liquor, continuously removing a stream of said centrifugally separable mixture from said vapor separating zone and delivering the same to a continuous centrifugal separator, separating said soap from said concentrated liquor in said separator to continuously deliver a separated effluent of said soap, admixing a stream of acid solution with said effluent to produce a mixture of saponifiable acids and a salt solution, continuously separating said salt solution from said saponifiable acids, mixing a stream of aqueous alkaline reagent with a stream of said saponifiable acids to form a resultant mixture containing soap, delivering a heated stream of the resultant mixture to a vapor separating zone, and continuously removing vapors therefrom to produce a purified soap.

5. The process of recovering purified soap from waste pulp liquor containing said soap, which comprises, withdrawing a stream of said liquor from a source of supply, heating said stream during flow thereof to a temperature sufficient to cause a predetermined amount of water to be in vapor form after discharge of said stream into a vapor separating chamber, discharging said stream into said vapor separating chamber, withdrawing sufficient water in the form of vapor from said chamber to render insoluble soap contained in said liquor and produce a centrifugally separable mixture of said soap and concentrated liquor, continuously removing a stream of said centrifugally separable mixture from said vapor separating zone and delivering the same to a continuous centrifugal separator, separating said soap from said concentrated liquor in said separator to continuously deliver a separated effluent of said soap, admixing a stream of acid solution with said effluent to produce a mixture of saponifiable acids and a salt solution, continuously separating said salt solution from said saponifiable acids, mixing a stream of aqueous alkaline reagent with a stream of said saponifiable acids to form a resultant mixture containing soap, heating a stream of the resultant mixture to a temperature above the melting point of said soap when anhydrous and delivering the heated stream to a second vapor separating zone, removing vapors from said second vapor separating zone in an amount sufficient to cause molten substantially anhydrous soap to be deposited in said second zone, and continuously removing and cooling said soap to form a purified soap product.

6. The process of separating material containing saponifiable acids combined with alkali from waste pulp liquor, which comprises, heating a confined stream of said liquor during flow thereof to a temperature sufficient to cause a predetermined amount of water to be in vapor form after discharge of said stream into a vapor separating chamber, discharging said stream into said vapor separating chamber, withdrawing sufficient water in the form of vapor from said chamber to cause said material in said liquor to become insoluble therein and produce a resulting mixture of precipitated particles of said material and concentrated liquor in which the concentrated liquor has a substantially greater specific gravity than said material, promptly withdrawing a stream of said resulting mixture from said chamber, delivering said stream of resulting mixture to a continuous centrifugal separator, maintaining the movement of said resulting mixture in said chamber and said stream of resulting mixture sufficiently rapid to cause said particles to remain substantially uniformly suspended in said concentrated liquor until delivered to said centrifugal separator, and continuously separating said material from said concentrated liquor in said centrifugal separator.

7. The process of separating material containing saponifiable acids combined with alkali from waste pulp liquor and recovering free saponifiable acids therefrom, which comprises, heating a confined stream of said liquor during flow thereof to a temperature sufficient to cause a predetermined amount of water to be in vapor form after discharge of said stream into a vapor separating chamber, discharging said stream into said vapor separating chamber, withdrawing sufficient water in the form of vapor from said chamber to cause said material in said liquor to become insoluble therein and produce a resulting mixture of precipitated particles of said material and concentrated liquor in which the concentrated liquor has a substantially greater specific gravity than said material, promptly withdrawing a stream of said centrifugally separable mixture from said chamber, delivering said stream of resulting mixture to a continuous centrifugal separator, maintaining the movement of said resulting mixture in said chamber and said stream of resulting mixture sufficiently rapid to cause said particles to remain substantially uniformly suspended in said concentrated liquor until delivered to said centrifugal separator, continuously separating said resulting mixture in said centrifugal separator and withdrawing a stream of said material from said centrifugal separator, mixing said stream of said material with a proportioned stream of mineral acid to produce a mixture containing free saponifiable acids, delivering a stream of the last mentioned mixture to a continuous centrifugal separator, and continuously separating said free saponifiable acids from said last-mentioned mixture.

8. The process of separating material containing saponifiable acids combined with alkali from waste pulp liquor and recovering a purified soap therefrom, which comprises, heating a confined stream of said liquor during flow thereof to a temperature sufficient to cause a predetermined amount of water to be in vapor form after discharge of said stream into a vapor separating chamber, discharging said stream into said vapor separating chamber, withdrawing sufficient water in the form of vapor from said chamber to cause said material in said liquor to become insoluble therein and produce a resulting mixture of precipitated particles of said material and concentrated liquor in which the concentrated liquor has a substantially greater specific gravity than said material, promptly withdrawing a stream of said resulting mixture from said chamber, delivering said stream of resulting mixture to a continuous centrifugal separator, maintaining the movement of said resulting mixture in said chamber and said stream of resulting mixture sufficiently rapid to cause said particles to remain substantially uniformly suspended in said concentrated liquor until delivered to said centrifugal separator, continuously centrifugally separating said material from said concentrated liquor in said separator, mixing sufficient water with said material after separation from said concentrated liquor to form a readily flowable mixture, heating a stream of the last-mentioned mixture to a temperature sufficient to vaporize impurities upon discharge of the same into a vapor separating zone, discharging said last-mentioned mixture into said zone, removing vaporizable impurities from said zone to produce a purified soap and removing said purified soap from said zone.

9. The process of recovering a purified soap from waste pulp liquor containing soap, which comprises, concentrating said liquor by continuously heating a stream of said liquor under pressure, introducing the heated stream into a vapor separating chamber and removing vapors from said chamber at a rate sufficient to maintain a vacuum therein and in an amount sufficient to render soap contained therein insoluble so as to produce a resulting mixture of precipitated particles of soap and concentrated liquor in which the concentrated liquor has a substantially greater specific gravity than said soap, promptly removing a stream of said resulting mixture from said chamber, delivering said stream of resulting mixture to a continuous centrifugal separator, maintaining the movement of said resulting mixture in said chamber and said stream of resulting mixture sufficiently rapid to cause said particles to remain substantially uniformly suspended in said concentrated liquor until delivered to said centrifugal separator, centrifugally separating said soap from said concentrated liquor, mixing sufficient water with the separated soap to form a readily flowable soap mixture, delivering a stream of said last-mentioned mixture to a vapor separating zone, removing vapors from said vapor separating zone to produce a purified soap, and removing said purified soap from said vapor separating zone.

10. The process of recovering a purified soap from waste pulp liquor containing soap, which comprises, concentrating said liquor by continuously heating a stream of said liquor under pressure, introducing the heated stream into a vapor separating chamber and removing vapors from said chamber at a rate sufficient to maintain a vacuum therein and in an amount sufficient to render soap contained in said liquor insoluble so as to produce a resulting mixture of precipitated particles of soap and concentrated liquor in which the concentrated liquor has a substantially greater specific gravity than said soap, promptly removing a stream of said resulting mixture from said chamber, delivering said stream of resulting mixture to a continuous centrifugal separator, maintaining the movement of said resulting mixture in said chamber and said stream of resulting mixture sufficiently rapid to cause said particles to remain substantially uniformly suspended in said concentrated liquor until delivered to said centrifugal separator, centrifugally separating said soap from said concentrated liquor, mixing sufficient water with the separated soap to form a readily flowable soap mixture, delivering a stream of said last-mentioned mixture to a vapor separating zone at a temperature above the melting point of said soap when anhydrous, removing vapors from said vapor separating zone at a temperature sufficiently high to cause molten substantially anhydrous soap to be deposited in said zone, and continuously removing said soap from said zone and cooling the same to form a purified soap.

11. The process of separating material containing fatty acids combined with alkali from waste pulp liquor, which comprises, heating said waste pulp liquor to a temperature sufficient to cause a predetermined amount of water to be in vapor form after discharge of said liquor into a lower pressure vapor separating zone, discharging a stream of the heated liquor into said vapor separating zone at said lower pressure, withdrawing sufficient water in the form of a vapor from said zone to maintain said lower pressure and cause said material in said liquor to become insoluble therein so as to produce a resulting mixture of precipitated particles of said material and concentrated liquor, maintaining the movement of said resulting mixture in said zone and said stream of resulting mixture sufficiently rapid to cause said particles to remain substantially uniformly suspended in said concentrated liquor until delivered to said centrifugal separator, promptly withdrawing a stream of the centrifugally separable mixture from said zone, delivering said stream of resulting mixture to a continuous centrifugal separator, maintaining the movement of said resulting mixture in said zone and said stream of resulting mixture sufficiently rapid to cause said particles to remain substantially uniformly suspended in said concentrated liquor until delivered to said centrifugal separator, and continuously separating said material from said concentrated liquor in said centrifugal separator.

BENJAMIN H. THURMAN.

REFERENCES CITED

The following references are of record in the file of this patent:

UNITED STATES PATENTS

| Number | Name | Date |
|---|---|---|
| 1,778,523 | Drewsen | Oct. 14, 1930 |
| 2,143,345 | Frankel et al. | Jan. 10, 1939 |
| 2,240,365 | Dreger | Apr. 29, 1941 |

Dedication 2,475,361.—*Benjamin H. Thurman*, New York, N.Y. PROCESS OF TREATING WASTE PULP LIQUORS. Patent dated July 5, 1949. Dedication filed June 30, 1964, by the assignee, *Benjamin Clayton, doing business as Refining, Unincorporated.*

Hereby dedicates to the public the terminal part of the term of said patent effective December 31, 1963.

[*Official Gazette September 29, 1964.*]